Jan. 28, 1969         P. D. MATTERN         3,423,835
                    DENTAL MATRIX CLAMP
                    Filed Oct. 12, 1966
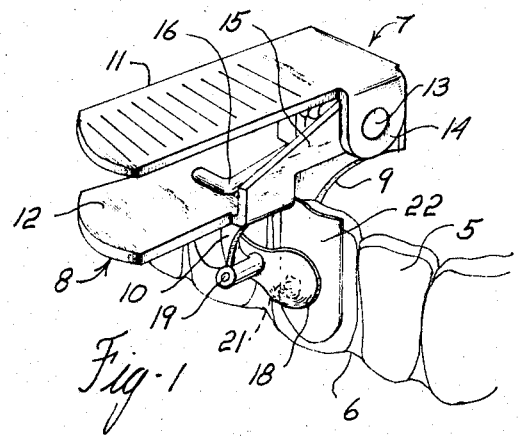
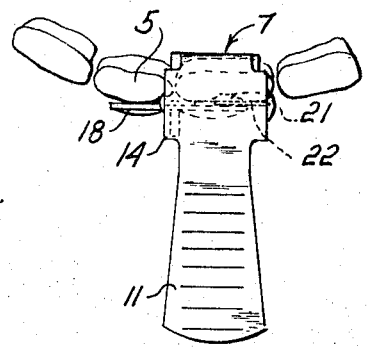
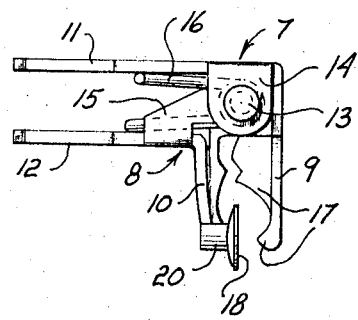
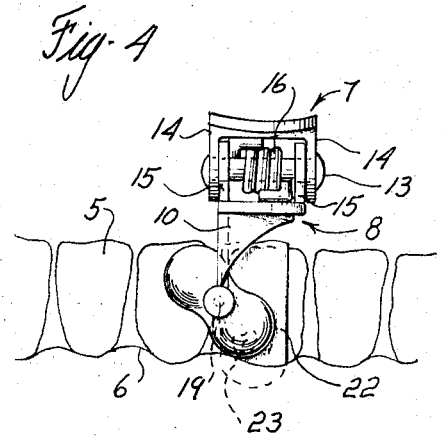
INVENTOR.
Paul D. Mattern
BY
ATTORNEYS United States Patent Office 3,423,835
Patented Jan. 28, 1969

3,423,835
DENTAL MATRIX CLAMP
Paul D. Mattern, Hatboro, Pa., assignor to M.S.V., Inc., Hatboro, Pa., a corporation of Pennsylvania
Filed Oct. 12, 1966, Ser. No. 586,241
U.S. Cl. 32—63                    2 Claims
Int. Cl. A61c 5/12

ABSTRACT OF THE DISCLOSURE

A dental matrix clamp comprising a pair of clamping jaws one of which has a relatively narrow gripping surface adapted to seat in the space between two adjacent teeth and the other of which is provided with an elongated gripping element pivotally mounted on the jaw about an axis positioned so that the end portions of the elongated gripping element may swing to different positions overlying portions of the adjacent teeth either close to the gum line or removed from the gum line.

---

This invention relates to clamps, and is particularly concerned with a clamp especially adapted for use as a dental matrix clamp. The clamp of the invention, moreover, is especially suited for employment on the anterior teeth of either the upper or the lower jaw.

In my Patent No. 3,191,304 issued June 29, 1965, I have disclosed a dental matrix clamp or retainer which is especially adapted for use in dental work where the matrix strip is positioned to encircle a tooth, the clamp of my prior patent being adapted to retain a matrix strip snugly engaged around the tooth, by clamping together the free ends of the matrix strip in the zone between the tooth being worked upon and an adjacent tooth. This arrangement is highly effective where a strip encircling the tooth is employed, for instance for the purpose of providing a dam or matrix over the filling in a cavity at the edge of the tooth opposite to the zone where the free ends of the strip are clamped.

In the case of cavities to be filled in certain other areas of the teeth, for instance at the front face of a tooth adjacent to the gum line, it is impractical or impossible to form a satisfactory dam or matrix by encircling the tooth with a matrix strip and clamping the free ends of the strip together. The present invention contemplates a modified form of clamp or retainer, as compared with my prior patent, arranged to cooperate with a matrix strip applied to various different areas of the anterior teeth, such as the front faces thereof.

The clamping mechanism according to the invention incorporates a relatively broad clamping element which is pivotally mounted on one of the clamp jaws in order to permit the clamping element to be swung over different areas of the adjacent teeth.

The manner in which the foregoing objects are achieved will appear more fully following the description given herebelow which refers to the accompanying drawing illustrating the preferred embodiment of the clamp according to the invention. In the drawing:

FIGURE 1 is a perspective view of the clamp of the present invention as applied to certain anterior teeth of the lower jaw, the scale of this view being approximately double life size;

FIGURE 2 is a top plan view of the clamp applied as in FIGURE 1;

FIGURE 3 is an elevational view of the clamp itself, taken from the side also appearing in perspective in FIGURE 1; and FIGURE 4 is a front elevational view of the clamp, taken from the right of FIGURE 3, but illustrating the clamp applied to anterior teeth of the lower jaw, with a different adjustment of the clamp as compared with FIGURE 1, in order to provide appropriate clamping over a different area of a tooth being filled.

In FIGURES 1, 2 and 4 several anterior teeth of the lower jaw are indicated in outline by the numeral 5, and the gum line of the lower jaw appears at 6.

The general arrangement of the jaws of the clamp of the present invention is similar to that described and illustrated in my prior patent above identified, but certain gripping elements associated with the jaws are different, as will further appear.

The clamp is made up of two pivotally interconnected parts indicated in general by the numerals 7 and 8. The clamp part 7 is provided with a jaw 9 and the clamp part 8 with a jaw 10. The two clamp parts also have the manual gripping elements 11 and 12. The jaw 9 and gripping element 11 of the clamp part 7 are extended generally at right angles to each other, as are also the jaw part 10 and the gripping element 12 of the clamp part 8, this being of advantage in facilitating application of the clamp without requiring an excessively wide mouth opening. The two clamp parts are interconnected by means of a pivot 13 which cooperates with apertured areas 14 and 15 provided respectively on the clamp parts 7 and 8.

The two clamping jaws 9 and 10 are yieldingly urged toward each other by means of a spring 16 wound about the pivot 13 and having its ends projecting between the finger gripping elements 11 and 12 and acting on those elements to separate them and thereby urge the clamping jaws 9 and 10 toward each other by pivotal movement about the pivot 13.

The jaw 9 of the clamp part 7 is provided with inwardly turned projections or teeth 17 which are adapted to engage the teeth to which the clamp is applied, and preferably the jaw teeth 17 are relatively narrow, so that they may enter part way between adjacent teeth to which the clamp is being applied and thereby laterally position the clamping device with respect to the teeth.

The clamp jaw 10 is provided with a relatively broad faced gripping element 18 which is pivotally mounted on the jaw 10 by means of a pivot pin 19 received in a cylindrical pivot support or bearing 20.

Certain additional structural arrangements and proportions of parts of the clamp of the invention are brought out herebelow in connection with the following description of the preferred mode of use of the clamp.

Thus, referring first to FIGURES 1 and 2, which illustrate in perspective and in top plan respectively, the use of the clamping device is there shown to assist in the filling of a cavity in the front face of one of the anterior teeth 5, such cavity being indicated at 21. After filling the cavity with porcelain or other desired filling material, a plastic matrix strip such as indicated at 22 is placed over the filled area of the tooth and the clamp is then applied, by opening the jaws 9–10 against the action of the spring 16 and placing the teeth 17 in the region between the tooth being filled and the next adjoining tooth. The gripping element 18 is of substantial dimension in a generally horizontal direction, so that one end of the gripping element 18 extends outwardly and over the area of the tooth being filled and therefore provides for clamping of the plastic matrix strip against the tooth.

Attention is now called to the fact that the gripping element 18 extends at both sides of its pivot 19, in view of which the two opposite ends of this gripping element engage the outer surface of two teeth, namely the tooth being filled and one of the adjoining teeth. Because of this, the gripping jaw 10 has in effect a broad base of gripping engagement with the teeth which stabilizes the clamping device and provides for more accurate and snug engagement of the gripping element over the area of the tooth being filled. In effect, the gripping of the clamping device has three points of engagement, one of which is on one side of the teeth and the other two at the opposite side.

As indicated in FIGURE 3 each end of the gripping element 18 is preferably somewhat dished, with the concave side presented toward the opposite jaw of the clamp, thereby providing a slightly cupped surface for engagement with the plastic matrix strip over the area of the tooth being filled. The gripping element 18 is also desirably of sufficient dimension to reach well over the surface of the two adjoining teeth in the region where the clamp is applied, and preferably of sufficient width to reach substantially across the adjoining teeth in the zone of application of the device. For the purpose of insuring accuracy of the engagement of the gripping element 18 with various different areas of the teeth to which the device is applied, the axis of the pivot 19 is preferably substantially perpendicular to the axis of the pivot 13 and thus to the direction of relative movement of the jaws 9 and 10 toward each other.

With the gripping element 18 constructed and mounted as above described, the device may readily be used for the filling of cavities in the anterior teeth in various different positions on the surfaces of teeth. Thus in FIGURE 1 the device is shown as being used in connection with the filling of a cavity located about midway between the upper edge of the tooth and the gum line. For this purpose, an shown in FIGURES 1 and 2, the gripping element 18 is positioned generally horizontally on its pivot 19. In contrast, in FIGURE 4, the device is shown as being used in connection with the filling of a cavity 23 located close to the gum line and in position where the lower end of the plastic matrix strip 22 projects below the gum line at the front face of the tooth. Here it will be seen that the gripping element 18 is swung about its pivot 19 so that the right hand end of the element as viewed in FIGURE 4 is extended downwardly at about 45° from the horizontal. Notwithstanding this pivoting of the right hand end of the gripping element so as to overlie the area of the tooth being filled, the other end of the gripping element still overlies the adjoining tooth and thus provides the stable engagement of the clamp as a whole in order to maintain a snug fit of the right hand end of the gripping element over the area of the tooth being filled.

I claim:

1. A dental matrix clamp comprising a pair of pivotally interconnected jaws adapted to engage teeth therebetween, spring means urging the jaws toward each other, manually operable elements connected with the jaws and providing for opening of the jaws against the action of the spring means, one of said jaws having a relatively narrow gripping element adapted to seat in the space between a pair of adjacent teeth, and the other jaw having an elongated gripping element pivotally mounted on the jaw intermediate the end of the element, the axis of the pivotal mounting for the elongated gripping element being positioned to intersect the mean plane thereof so that end portions of the elongated gripping element may swing upwardly and downwardly to different positions overlying each of two adjacent teeth.

2. A clamp according to claim 1 in which the axis of the pivot mounting the elongated gripping element on the jaw extends generally perpendicularly to the pivot interconnecting the pair of jaws.

References Cited

UNITED STATES PATENTS

| 339,072   | 3/1886 | Nies | 32—63 XR |
| 2,519,246 | 8/1950 | Haas | 32—63    |

ROBERT PESHOCK, *Primary Examiner.*